Patented Aug. 25, 1953

2,650,246

UNITED STATES PATENT OFFICE 2,650,246

PRODUCTION OF ACETIC ACID FROM METHANOL

Edward Boaden Thomas and Edmund Harry Alcock, Spondon, near Derby, England, assignors to British Celanese Limited, a corporation of Great Britain No Drawing. Application October 4, 1950, Serial No. 188,481. In Great Britain November 4, 1949

8 Claims. (Cl. 260—532)

This invention relates to improvements in the production of acetic acid.

The formation of acetic acid by reaction between carbon monoxide and methanol has been known for many years. Recently attention has been drawn to the use of nickel iodide (see BIOS Final Report No. 1558) or the joint use of a carbonyl and iodine (see FIAT Final Report No. 933) as catalysts for a liquid phase reaction between carbon monoxide and methanol carried out under the high pressures of 200 to 300 atmospheres or more. Difficulties were encountered in using these catalysts, in particular in that, while high conversions and yields could be obtained in a batch process, poorer results were obtained when it was attempted to carry out the process continuously and considerable corrosion of the equipment used always occurred.

In investigating the use of these catalysts in a continuous operation the inventors have found, in addition, that the volatility of nickel carbonyl and methyl iodide, which are invariably present in the reaction zone whatever the form in which the nickel and iodine are introduced, is such that substantial quantities of these substances appear in the gaseous effluent. These costly materials can be and, indeed, must be recovered for re-use, but the rate at which they are removed from the reaction zone constitutes a serious drawback since it makes necessary the handling of considerable quantities of materials. Thus, loss of quite a small proportion of the materials can seriously affect the economics of the process, while the cost of recovering and returning in suitable form to the reaction zone the large quantities of iodine and nickel compounds is always a major item in the cost of operating the process.

The present invention is concerned with the introduction of certain novel features into the process above referred to, these features being individually valuable and together leading to a very much improved process, especially as regards the maintenance of adequate quantities of nickel and iodine in the reaction zone without undue expense being involved in their recovery from the gaseous effluent.

According to the invention acetic acid is produced by a continuous process which comprises introducing carbon monoxide and methanol into a reaction zone in which they react under a pressure of less than 50 atmospheres and at a temperature below 250° C. and which is sufficiently elevated to prevent condensation of acetic produced, the reaction being carried out under the joint catalytic influence of nickel and iodine in a reaction zone containing active carbon impregnated with nickel iodide, and withdrawing the products of the reaction, iodine lost from the active carbon being replaced by a suitable supply during the process. By means of the invention substantial conversions and good yields are obtained at the relatively low temperatures specified and at such low pressures that condensation of acetic acid in the reaction zone is avoided. Moreover, the invention admits of continuous operation in the vapor phase while avoiding the serious corrosion problems encountered by earlier workers using nickel and iodine together. Continuity of operation over long periods is ensured by providing a supply of iodine, e. g. as methyl iodide, to the catalyst during the process.

Initially, the active carbon, conveniently in the form of granules, can be impregnated with an aqueous solution of nickel iodide and the impregnated product dried until its water content is reduced to a suitable value. Generally satisfactory results are obtained using a product containing not more than 6 or 7 molecules of water per molecule of anhydrous nickel iodide, but much less water than this may be present and, if desired, a substantially anhydrous catalyst can be used. It is not necessary that the active carbon should carry a high proportion of nickel iodide and quantities equal to one half to one gram-molecule of $NiI_2$ per litre of granular active carbon are adequate and even smaller quantities may be used.

During the progress of the synthesis there is some loss of nickel iodide from the active carbon, and this can be replaced by the continuous or intermittent introduction of an additional supply of nickel and iodine, e. g. as a solution of nickel iodide, and/or by the introduction of volatile compounds of the nickel and iodine, e. g. nickel carbonyl and methyl iodide. The nickel and iodine are not usually lost from the reaction in stoichiometrically equivalent quantities, and usually rather more iodine than nickel is lost in a given time. Accordingly it is preferred always to introduce some iodine, conveniently as methyl iodide recovered from the products of the process, into the reaction zone during the process. Where both nickel and iodine are introduced during the process it is desirable to arrange the ratio of nickel to iodine supplied so as to avoid progressive enrichment of the active carbon with nickel.

Water may be present in the reactants introduced into the reaction zone as well as in the nickel iodide-charged active carbon and, indeed, the presence of water in the reactants has the effect of suppressing the production of methyl acetate, which is also produced in the process, and increasing the production of free acetic acid. However, it has been found that the introduction of large quantities of water is liable to lead to increased loss of nickel and iodine from the reaction zone, particularly in a continuously operated process where the water increases the quantities of vaporous materials passing through the reaction zone. It is usually found that the use of 5 to 10 moles of methanol, and especially about 8 moles of methanol, with each mole of water gives satisfactory results.

Another important feature of the invention comprises carrying out the synthesis under the joint catalytic influence of nickel and iodine, at pressures substantially below those which have heretofore been regarded as necessary. It has been found possible, according to the invention, to obtain commercially useful conversions and yields at pressures substantially below 50 atmospheres, e. g. pressures of up to 30 atmospheres, thus making unnecessary the very expensive equipment needed when pressures of more than 100 atmospheres are used. Even at atmospheric pressure it has been found possible, using active carbon impregnated with nickel iodide as catalyst, to achieve conversions of methanol to acetic acid of more than 30% per pass.

Quite apart from the less expensive equipment used, there is an additional advantage gained by using low pressures in that low reaction temperatures can be employed without the acetic acid produced condensing on the catalyst; in this way a continuous synthesis can be operated at low temperatures. The use of such low temperatures makes possible the carrying out of the process in presence of hydrogen without the excessive formation of methane which has been found to occur in the presence of hydrogen at temperatures substantially above 200° C. In this way the acetic acid can be produced directly from the products obtained by reacting carbon monoxide and hydrogen in presence of a methanol-forming catalyst without first separating the methanol.

In the process of the invention the temperatures used may be in the neighbourhood of or even below 200° C., e. g. between 130 and 190° C., and a continuous process can be operated to give a good yield and conversion at these temperatures with pressures of 10 to 30 atmospheres. However, the reaction takes place with the active carbon supported catalyst at even lower temperatures, a useful conversion being obtained even at 100 to 110° C. under the quite moderate pressure of 50 atmospheres. Somewhat higher temperatures may, however, be used and higher conversions per pass thereby achieved although in no case should the temperature be allowed to rise considerably above 200° C. and the preferred operating maximum is 230° C.

The contact time employed can be varied within quite a wide range, and continuous operation has been carried out using contact times of substantially less than one minute, e. g. 0.1 to 0.2 minute, although longer contact times, e. g. 1 to 3 minutes, are preferred and even longer times, e. g. 5 or more minutes, may be used if desired.

The production of methanol involves reaction between 2 molecules of hydrogen and each molecule of carbon monoxide. According to one method of operating a combined process of synthesising methanol and using the products directly for the production of acetic acid, the methanol synthesis stage is initiated with a gas mixture containing carbon monoxide and hydrogen in the stated proportion, but thereafter the operation of the process is continued by recycling unchanged gas issuing from the acetic acid stage together with make-up gas containing carbon monoxide and hydrogen in equimolecular proportions. The make-up gas can be introduced after the methanol stage and before the products from this stage are introduced into the acetic acid stage, or before the recycle gas is introduced into the methanol stage or at both points. Operating in this way has the advantage that once the process has been started up, the gas supplied can be water gas which has merely been suitably purified but which has not had to be subjected to ratio adjustment to enrich it with one or other of these main constituents. This object can also be achieved by feeding to the acetic acid stage a mixture of methanol vapour and water gas and utilising the effluent after removal of condensable substances in a methanol synthesis stage. Where the conversion of carbon monoxide in the acetic acid stage is very high, the effluent gas may be most suitable for enriching with hydrogen water gas to be used in the methanol stage. It should be noted that it is desirable to operate the acetic acid stage so as to achieve a high conversion of carbon monoxide and thus to reduce the volume of gases issuing from the reaction chamber, as in this way the amount of nickel and iodine carried away is kept low.

As already indicated, the presence of active carbon in the reaction zone reduces considerably the amount of catalytically active material removed from the reaction zone in the gaseous effluent. However, it is desirable to provide for the recovery of any catalyst which does escape, and it has been found possible to achieve this object by passing the gaseous effluent through active carbon maintained at a lower temperature than that used in the reaction zone. When the active carbon used in this way has absorbed a sufficient quantity of catalyst to make recovery worth while, this may be done by steaming the active carbon or by washing it with a suitable solvent, e. g. methanol. Alternatively, a pair of identical vessels charged with active carbon may be used in series, the first as reaction vessel and the second for absorbing catalyst from the gaseous effluent leaving the first reaction vessel and from which condensable materials such as acetic acid and unchanged methanol have been first removed. By providing suitable valved connections, the flow may be reversed so that the second vessel becomes the reaction vessel and the first the absorption vessel when the change in catalyst concentration on the active carbon in the two vessels has reached a suitable stage.

Under the conditions employed in carrying out the process of the invention nickel chloride and nickel fluoride and the halides of other metals, including the other iron metals, show little or no catalytic activity. Furthermore, only active carbon appears to be useful in the process, other substances often used as catalyst supports giving results that are useless from a commercial viewpoint. The following example illustrates these points.

Example 1

A mixture of methanol, water vapour, carbon monoxide and hydrogen, in approximately the molecular proportions of 4:1:8:8 was passed through a reaction vessel charged in turn with each of the catalysts given below. During each trial the temperature of the reaction vessel was maintained at 195 to 215° C., the pressure employed was 200 lbs. per sq. in. gauge and the contact time was 2.5 minutes. In each case the catalyst contained initially per litre of granular support approximately 2 moles of water and one mole of (anhydrous) metal halide. The conversions given, which were obtained in a single passage over the catalyst, relate to the total acetic acid formed, part of which was always recovered as methyl acetate.

| Halide | Support | Conversion, percent |
|---|---|---|
| $NiI_2$ | Active carbon | 50.5 |
| $NiI_2$ | Silica gel | 4 |
| $NiI_2$ | Active alumina | 4 |
| $NiCl_2$ | Active carbon | 0.1 |
| $NiF_2$ | do | 6.5 |
| $CoI_2$ | do | 3.7 |
| $CoBr_2$ | do | 0.8 |
| $FeI_2$ | do | 8.2 |
| $CuI_2$ | do | 0.5 |

The following example further illustrates the invention:

Example 2

The apparatus employed comprises a tubular reaction vessel arranged vertically and provided with internal pipes and an external jacket for the circulation of oil and oil heating and cooling means to enable the temperature within the reaction zone to be brought to and maintained within the desired range. The vessel is provided with an inlet for reactants near the top, a product outlet near the bottom and an internal grid just above the product outlet to support the catalyst bed. Thermocouples are provided through the zone to be occupied by catalyst so that the temperatures at different levels in the catalyst may be determined and the development of local hot-spots detected.

The vessel is charged with a catalyst obtained by impregnating a highly absorptive active carbon of 8-10 mesh with a strong solution of nickel iodide and partly drying by heating at 70-80° C. for 16-20 hours, the quantity and concentration of the solution used being such as to give a product containing about one mole of nickel iodide per litre of the partly dried catalyst. The catalyst is then further dried by passing nitrogen downwardly through the vessel for 6 hours while the temperature of the catalyst bed is raised to about 180° C.

The stream of nitrogen is then replaced by a stream of water gas containing carbon monoxide and hydrogen in approximately the proportions of 1:1.1 and at the same time a supply of aqueous methanol of 85-90% concentration by weight containing 47.5 gms. of methyl iodide per litre is introduced, the supplies of water gas and methanol being adjusted so that about 2 moles of carbon monoxide are introduced per mole of methanol. The reactants are introduced and the products withdrawn at such rates as to give a contact time of about 2.5 minutes.

The exothermic reaction which ensues is allowed to cause the temperature within the reaction zone to rise to about 200° C. and thereafter the temperature and rate of flow of oil through the tubes and jackets referred to are controlled so that the temperature in the reaction zone is maintained between 200 and 230° C. The pressure within the reaction zone is maintained at about 200 lbs. per sq. in. gauge.

On cooling the gases and vapours issuing from the reaction zone, acetic acid and methyl acetate are obtained in approximately equal proportions and in quantity corresponding to a conversion of the methanol to total acetic acid of more than 50% during a large part of a period of some 200 hours or more but falling towards the end of this period to 40% or somewhat lower.

The products condensed include also methyl iodide and unchanged methanol which can be separated and returned to the process, while the gaseous products comprise carbon monoxide and hydrogen together with some methane and a little nickel carbonyl and uncondensed methyl iodide; the nickel carbonyl and methyl iodide can be recovered by absorption on active carbon or by strong cooling, e. g. with solid carbon dioxide. The mixture of carbon monoxide and hydrogen obtained when operating in this manner is considerably enriched in hydrogen and can be used for the synthesis of methanol.

After a period of about 200 to 250 hours the active carbon is recharged with nickel iodide by allowing the reaction vessel to cool, reducing the pressure to 0.5 atmosphere and then allowing a 7.5 N solution of nickel iodide in quantity equal to 140-150 cc. per litre of catalyst to be drawn into the top of the vessel in two equal portions, allowing about 20 minutes for the introduction of each portion and an interval of 20 minutes between the two portions. The catalyst is then dried by passing a current of nitrogen through the reaction zone while raising the temperature to 180° C., this step occupying a period of about 6 hours. The methanol, carbon monoxide and hydrogen are then reintroduced and the production of acetic acid resumed.

Having described our invention, what we desire to secure by Letters Patent is:

1. A continuous process for the production of acetic acid, which comprises introducing carbon monoxide and methanol into a reaction zone in which they react under a pressure of less than 50 atmospheres and at a temperature below 250° C. and which is sufficiently elevated to prevent condensation of acetic acid produced, the reaction being carried out under the joint catalytic influence of nickel and iodine in a reaction zone containing active carbon impregnated with nickel iodide, and withdrawing the products of the reaction, iodine lost from the active carbon being replaced by a suitable supply during the process.

2. Process according to claim 1, wherein the reaction is carried out under a pressure of less than 30 atmospheres and at a temperature in the neighbourhood of 200° C.

3. Process according to claim 1, wherein the catalyst initially comprises not more than 1 mole of nickel iodide per litre of active granular carbon.

4. Process according to claim 1, wherein nickel carbonyl is introduced into the reaction zone during the process to replace nickel lost from the active carbon.

5. Process according to claim 1, wherein the reaction is carried out in the presence of water vapour.

6. Process according to claim 1, wherein the reaction is carried out in the presence of hydrogen.

7. Process according to claim 6, wherein substantially equimolecular proportions of carbon monoxide and hydrogen are introduced into the reaction zone.

8. A continuous process for the production of acetic acid, which comprises introducing carbon monoxide and methanol into a reaction zone in which they react under a pressure of less than 30 atmospheres and at a temperature between 200 and 250° C. which is sufficiently elevated to prevent condensation of acetic acid produced, the reaction being carried out under the joint catalytic influence of nickel and iodine in a reaction zone containing active carbon impregnated initially with a quantity of nickel iodide equal to between ½ mole and 1 mole of nickel iodide per litre of granular active carbon, and withdrawing the products of the reaction, iodine lost from the active carbon being replaced by supplying methyl iodide to the reaction zone during the process.

EDWARD BOADEN THOMAS.
EDMUND HARRY ALCOCK.

References Cited in the file of this patent

UNITED STATES PATENTS

| Number | Name | Date |
|---|---|---|
| 1,979,450 | Carpenter | Nov. 6, 1934 |
| 2,158,031 | Loder | May 9, 1939 |
| 2,448,368 | Gresham et al. | Aug. 31, 1948 |
| 2,448,375 | Larson | Aug. 31, 1948 |
| 2,457,204 | Brooks | Dec. 28, 1948 |
| 2,462,738 | Gresham | Feb. 22, 1949 |

OTHER REFERENCES

Reppe, "Acetylene Chemistry," P. B. Report 18852-S (Charles A. Meyer and Co., Inc.), pp. 161, 171–173 (1949).

Peck et al., "Interview with Dr. J. W. Reppe," Fiat Final Report No. 273, October 2, 1945, distributed by R. L. Hasche (pp. 9, 10).